United States Patent [19]
Duncan et al.

[10] Patent No.: US 6,215,597 B1
[45] Date of Patent: Apr. 10, 2001

(54) APPARATUS FOR FORMING A PLURALITY OF SUBIMAGES HAVING DIFFERENT CHARACTERISTICS

(75) Inventors: David B. Duncan, Auburn; Gregory J. Leeson, Colfax; Judith G. Duncan, Auburn, all of CA (US)

(73) Assignee: Duncan Technologies, Inc., Auburn, CA (US)

( * ) Notice: Subject to any disclaimer, the term of this patent is extended or adjusted under 35 U.S.C. 154(b) by 0 days.

(21) Appl. No.: 09/441,825

(22) Filed: Nov. 17, 1999

(51) Int. Cl.[7] .................................................. G02B 27/14
(52) U.S. Cl. ................................. 359/637; 359/634
(58) Field of Search ............................... 359/618, 634, 359/640, 637

(56) References Cited

U.S. PATENT DOCUMENTS

| | | | |
|---|---|---|---|
| 4,084,180 | 4/1978 | Stoffels et al. | 358/55 |
| 4,444,472 | 4/1984 | Tanaka | 359/676 |
| 4,789,891 | 12/1988 | Kanayama et al. | 358/55 |
| 4,916,529 | 4/1990 | Yamamoto et al. | 358/50 |
| 5,134,468 | 7/1992 | Ohmuro | 358/50 |
| 5,221,964 | 6/1993 | Chamberlain et al. | 358/229 |
| 5,760,969 | 6/1998 | Suzuki | 359/688 |
| 5,870,228 | 2/1999 | Kreitzer et al. | 359/649 |
| 5,889,555 | 3/1999 | Kawase et al. | 348/336 |

*Primary Examiner*—Ricky Mack
(74) *Attorney, Agent, or Firm*—Thomas R. Lampe

(57) ABSTRACT

Apparatus for forming multiple subimages including an image forming lens, a color separating prism, subimage receptors for receiving subimages from the prism, and lenses compensating for spherical aberrations caused by the prism and controlling the size of the subimages reaching the subimage receptors. Other features include structure for dissipating heat from the subimage receptors and from circuit boards associated with the subimage receptors.

35 Claims, 11 Drawing Sheets

APPARATUS FOR FORMING A PLURALITY OF SUBIMAGES HAVING DIFFERENT CHARACTERISTICS

TECHNICAL FIELD

This invention related to apparatus for forming subimages from a primary image. The invention is particularly applicable to camera systems for forming multispectral images.

BACKGROUND OF THE INVENTION

In recent years, multispectral imaging has been demonstrated to be a useful method of evaluating features of plants, identifying defects in produce, or providing feature identification of other materials such as plastics and wood. Prism based multispectral cameras use a color separating prism to split an image into multiple images, each in a specific spectral band. The spectral bands can be in the ultraviolet, visible, and near infrared spectral regions. For plant imaging, color-infrared imaging is commonly utilized with imaging bands in the green, red, and near infrared regions. Satellite based systems are often used for this type of imaging in remote sensing applications. The French-built SPOT satellite acquires images in the green, red, and near infrared bands. The U.S.-built LANDSAT satellite acquires images in four spectral bands (blue, green, red, and near infrared). In many cases, terrestrial multispectral imaging has been accomplished using clusters of cameras, each filtered for a specific spectral region. These cluster cameras have proven difficult to align and maintain. Alternatively, multispectral imaging can be accomplished by using a common objective lens and a color separating prism to separate spectral bands. The primary applications for multispectral imaging require a rugged camera not affected by temperature and vibration. Applications include aerial imaging, produce sorting, and advanced surveillance.

Color separating prisms and lenses specifically designed to work with these color separating prisms are used extensively in electronic news gathering (ENG) cameras. Many color separating prisms have been developed and patented. A common color separating prism geometry is described in U.S. Pat. No. 4,084,180, issued Apr. 11, 1978. The dichroic image separating coatings can be selected to separate spectral image channels throughout the ultraviolet, visible, and near infrared spectra.

The color separating prism introduces spherical aberrations and chromatic aberrations in the resulting images. Lenses designed specifically to be used with color separating prisms are described, for example in U.S. Pat. No. 5,760,969, issued Jun. 2, 1998. The color separating prism overcorrects spherical aberration. To compensate for this effect, lenses for use with these prisms are designed to undercorrect spherical aberration thereby causing the two effects to cancel each other. Similarly these lenses are designed to compensate for longitudinal chromatic aberrations introduced by the prism glass material.

Commercial ENG lenses are corrected for chromatic aberrations in the visible spectral region. Outside of the visible spectral region commercial ENG lenses commonly exhibit longitudinal chromatic aberrations that result in a shift of the focal plane location and differences in the size of the resulting images as a function of wavelength. In addition many ENG lenses are highly absorptive in the near infrared rendering them ineffective for multispectral imaging, so either a custom lens or a commercial lens with a long back focal length adapted for use with a multispectral color separating prism is required.

Lenses for use with Single Lens Reflex (SLR) cameras are designed with a long flange focal length to accommodate the pentaprism view finder. These SLR lenses are not designed to correct for prism induced aberrations so the use of SLR lenses with color separating prisms results in undesirable aberrations. However SLR lenses have a flange focal length adequate to physically accommodate a color separating prism between the lens and image plane. Similarly mid and large format still camera lenses have long flange focal lengths but are not designed to compensate for the presence of a color separating prism.

Multispectral imaging is best accomplished when the images acquired by each channel's image sensing device are identical in size. It is desirable that the image sensing pixels in each image channel see exactly the same geometric region in the field-of-view so that the images are exactly registered. Achromat ENG lenses and color separating prisms provide good image registration in the visible portion of the spectrum but exact image registration is not feasible over a broad spectral range that spans beyond the visible region.

In existing 3-CCD cameras, the imaging array is bonded directly to the prism. U.S. Pat. No. 4,916,529, issued Apr. 10, 1990, describes a 3-CCD color separating prism. In this type of configuration, the thickness of the trim filters must be very exactly controlled and, once bonded, cannot be interchanged. For specific applications, i.e., primary color (red, green blue) imaging this is acceptable. Multispectral imaging often requires trim filters specific for the application. Commercial bandpass filters used for trim filters in multispectral cameras often do not have accurately controlled thickness.

In existing 3-CCD cameras, the thermal waste heat from the imaging sensors and electronics is conducted into the color separating prism. Temperature gradients in the prism can cause image distortion and stresses in the bond joints. The glass prism is a poor thermal conductor so the imaging array temperature is often elevated significantly above ambient. Imaging arrays generally have a doubling in noise for every 10° C. rise in temperature. Linear arrays operate at high pixel clock rates, have large photosite areas, and large pixel counts that result in particularly high heat dissipation.

Existing cameras dissipate thermal waste heat via free convection using a perforated camera case or by forced convection using a fan. Both of these approaches provide a direct path for dirt to enter the camera electronics and optics, exposing the camera components to contaminates. U.S. Pat. No. 5,221,964, issued Jun. 22, 1993, shows printed circuit boards mounted on standoffs, with no good thermal conduction path to the outside environment.

The following patents are also of some degree of relevance: U.S. Pat. No. 4,444,472, issued April, 1984, U.S. Pat. No. 4,789,891, issued December, 1988, U.S. Pat. No. 5,134,468, issued July, 1992, U.S. Pat. No. 5,870,228, issued February, 1999, and U.S. Pat. No. 5,889,555, issued March, 1999.

The patents do not teach or suggest the invention disclosed and claimed herein.

DISCLOSURE OF INVENTION

The present invention satisfies the foregoing need to correct for aberrations and image size in camera optics for multispectral cameras with color separating prisms. It provides a means of positioning said optics relative to image sensors and a means of preventing heat from the image sensor and electronics from affecting the optics.

According to one aspect of the invention, a lens with positive focal length is placed between a SLR camera lens and a color separating prism to introduce spherical aberrations at least partially compensating for spherical aberrations caused by the presence of a color separating prism. Lenses with negative focal length are placed in between each imaging detector or subimage receptor and the color separating prism. Image size for each channel is controlled by the spacings between the negative focal length lens, color separating prism and subimage receptor. The power of the negative focal length lens can be identical for each imaging channel and image size controlled only by spacing, or the focal length can be different for each lens, allowing image size to be controlled by a combination of lens power and spacing.

According to another aspect of the invention, one or more surfaces of the positive focal length lens and one or more surfaces of the negative focal length lens can be aspheric, the aspheric surfaces used to correct for distortion introduced by the compensating lenses.

According to another aspect of the invention, a multi-element lens in front of the color separating prism and a lens in between the color separating prism and image sensor or receptor for each optical channel is used to adjust image size. The image size adjusting lenses can be either positive or negative focal length lenses depending upon the multi-element lens design. This multi-element lens and color separating prism combination provides wide angle (>60 degree) field-of-view with distortion under 0.05% and exact registration of pixels throughout the image field.

According to another aspect of the invention, the spacings between the imaging sensors and color separating prism are adjustable, allowing trim filters of various thicknesses to be installed and then the imaging sensor adjusted for optimum focus. This removability and adjustability feature allows interchange of trim filters without damaging the color separating prism or image sensors.

According to another aspect of the invention, the trim filters can be bonded to the prism. A compensating lens between the prism and array is used to correct for aberrations caused by the prism and to adjust image size.

According to another aspect of the invention, the image sensor is mounted to a low thermal expansion holder which is also a poor conductor of heat. Heat dissipated by the image sensors is shunted away from the prisms and optics using a high thermal conductivity member, dissipating the heat into the camera baseplate rather than into the color separating prism.

According to another aspect of the invention, pairs of plates with flat surfaces parallel to the prism exit surfaces are used to position the arrays relative to the prism, adjustment providing accurate registration between the pixels in the imaging arrays. Shims are used to provide axial positioning of the arrays for focus adjustment.

According to another aspect of the invention, the image sensor can be either an area array sensor composed of a two dimensional matrix of photosites or a linear array composed of 1–3 rows of photosites. The image sensors in the various spectral channels do not need to be identical in pixel pitch and can be of a mixed sensor technology (CMOS, CCD, inGaAs, etc.). The compensating optics are used to scale the image sizes to match the image sensor providing an exact correspondence of pixel location between the image spectral channels or a numerical multiple spacing.

According to another aspect of the invention, the camera electronics printed circuit boards are conductively cooled using a wedge type retainer to hold the boards in slots in a heat dissipating base plate. A motherboard provides electrical interconnection between the support boards and additional mechanical support. Thermal conduction cooling of the support boards reduces convective heating of the image sensors.

Other features, advantages, and objects of the present invention will become apparent with reference to the following description and accompanying drawings.

MODES FOR CARRYING OUT THE INVENTION

Figure 1:
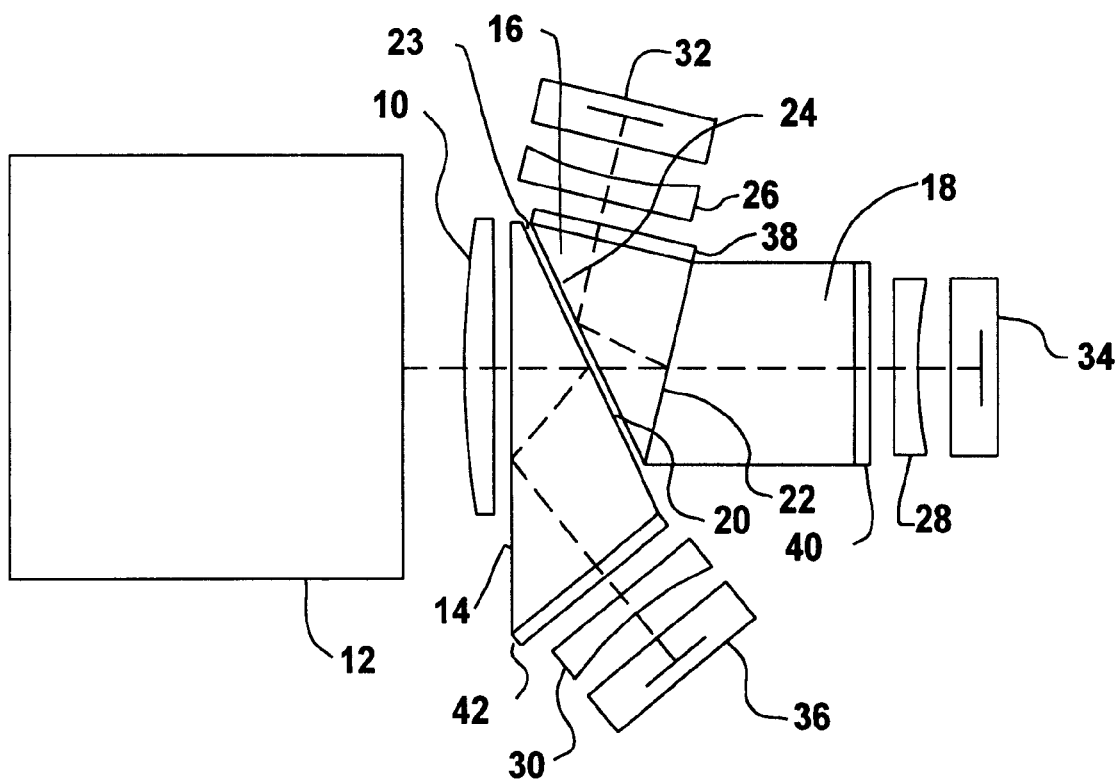
FIG. 1 is a diagrammatic side elevation view of a multi-spectral prism based optical assembly for an SLR or large format lens.

FIG. 1 is a diagrammatic, side elevation view illustrating camera components including a color separating prism assembly according to the teachings of the present invention, the arrangement employed to convert a primary image into subimages, the subimages having different spectral characteristics. A positive power refractive element or lens 10 behind an image forming lens 12 introduces aberrations to negate aberrations caused by the color separating prism. The color separating prism is composed of prism elements 14, 16 and 18. A dichroic coating 20 on prism element 14 reflects a spectral band, typically the shortest wavelength band. Often this shortest spectral band is in the blue and green spectral region. A dichroic coating 22 on prism element 18 reflects the next spectral band (typically the red spectral region). An air gap 23 between prism elements 14 and 16 causes the band reflected by coating 22 to be reflected at surface 24 by total internal reflection. Prisms 16 and 18 are bonded together using an optical adhesive of any suitable type. A third band is transmitted through dichroic coating 22. Negative power compensating lenses 26, 28, and 30 are used to adjust image size of subimages imaged at image receptors in the form of electronic imaging arrays or image sensors 32, 34, and 36 respectively, by controlling the spacing between the image sensors and compensating lenses. Trim filters 38, 40, and 42 are used to accurately regulate the spectra of the submimages incident on the imaging arrays.

Figure 2:
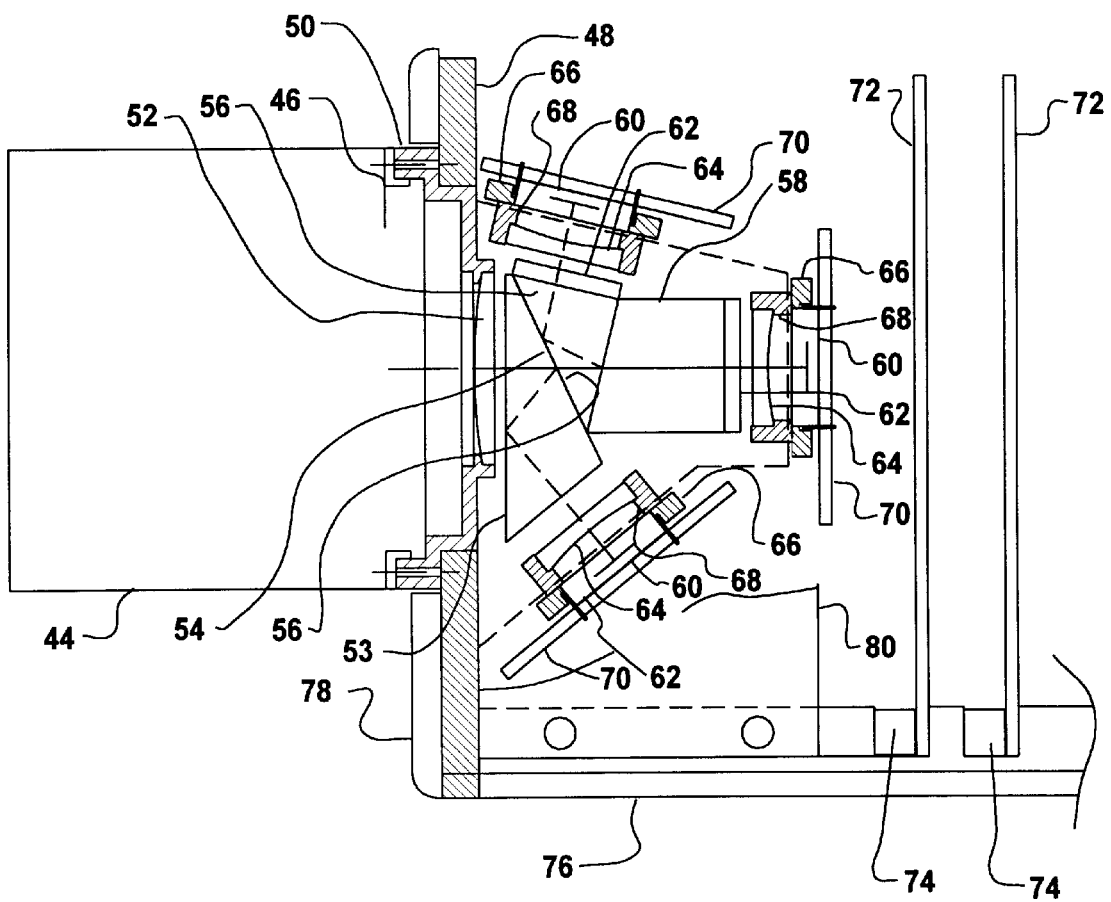
FIG. 2 is a diagrammatic side, partial sectional view showing the compensating optics of the camera mounted adjacent to the color separating prism and the mounting system for the optical components.
Figure 3:
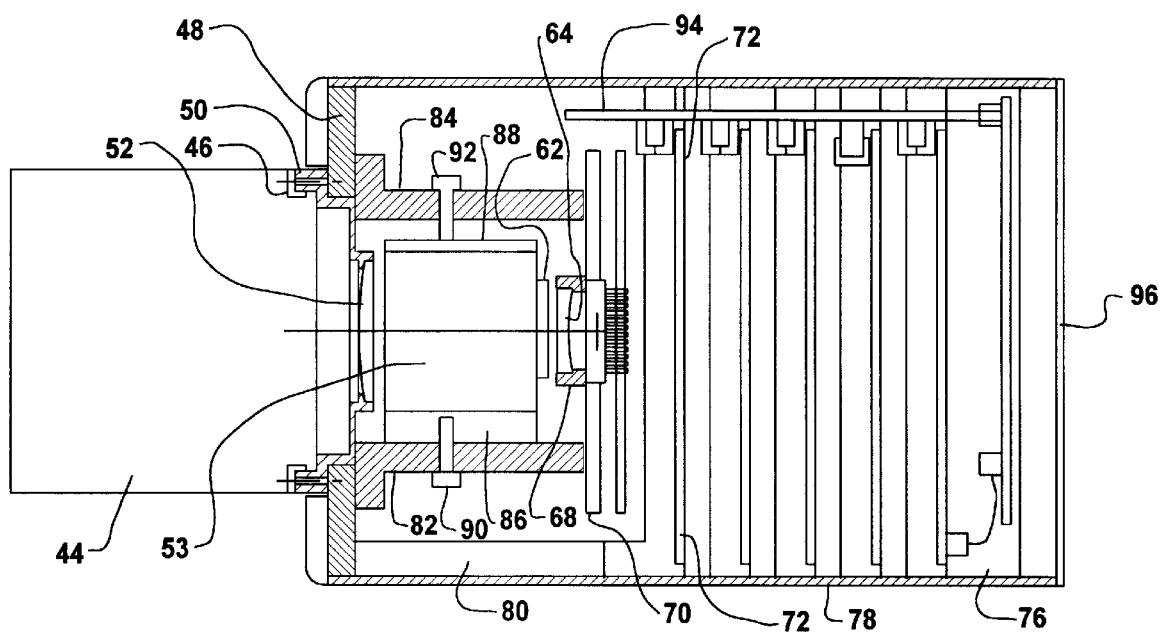
FIG. 3 is a diagrammatic top, partial sectional view showing the prism and imaging array mounting rails, a prism retainer, and thermal shunt bar.

FIGS. 2 and 3 are, respectively, diagrammatic, side, elevational, partial cross-sectional and diagrammatic, top, partial cross-sectional views of a multispectral 3-CCD camera embodiment constructed according to the teachings of the present invention and having the general overall layout shown in FIG. 1. An SLR lens 44 attaches to bayonet mount 46 which is attached to front mounting plate 48 by lens retainer 50. Front mounting plate 48 is made from low expansion coefficient 416 stainless steel or a titanium alloy or other suitable material. Lens retainer 50 holds planoconvex compensating lens 52. The color separating prism 53 composed of prism elements 54, 56, and 58 separates the primary image into three spectral regions and directs the subimages to image sensing arrays 60. Trim filters 62 block all light outside of the spectral band specified for each imaging array 60. A holder 66 positions each image array 60 relative to the color separating prism. A holder 68 positions each image compensating lens 64 relative to its associated imaging array 60. A printed circuit board 70 is soldered to each imaging array 60 to provide ancillary circuitry required for imaging array operation.

In FIG. 2 printed circuit boards 72 provide the remainder of the camera circuitry not on array driver printed circuit boards 70. These boards are mounted using wedge-type thermal conducting mounts 74 providing good thermal contact between the printed circuit boards 72 and a base plate 76 of camera body or case 78. These mounts also provide rugged mechanical fixing of the printed circuit boards. By providing good thermal conduction cooling of printed circuit boards 72, the thermal convection heat load into the camera optics and imaging arrays is reduced, improving the performance of these components.

In FIG. 2 an array mounting bar 80 is attached to left and right side rails 82, 84 as is the color separating prism assembly. The array mounting bar is made from a low expansion coeficient metal (416 stainless steel or titanium, for example). The mounting rails 82, 84, prism assembly 53 and array mounting bar 80 are nearly identical in their expansion coefficient, minimizing sensitivity to temperature changes. Prism mounting plates 86 and 88 are bonded to opposite sides of prism assembly 53. Mounting rails 82, 84 are attached to front plate 48. Screws 90 are used to anchor the prism assembly to the mounting rails and screws 92 are used to apply a load to mounting plate 88 keeping bond joints between prism 53 and mounting plates 86 and 88 in compression.

In FIG. 3 support electronics printed circuit boards 72 are connected to a motherboard 94 providing a digital and analog bus between boards and providing mechanical fixing of the boards.

The camera body or case 78 contributes to formation of a hermetic enclosure protecting the internal camera components from environmental elements. Camera case 78, rear panel 96, front mounting plate 48, lens retainer 50, and compensating lens 52 form a contiguous enclosure. This sealed enclosure can protect the camera optics and electronics from moisture and dirt contaminates. The conduction cooling features dissipate waste heat through the camera case, eliminating the need for performations in the camera case. The compensating lens provides a means of forming a contiguous barrier not found in conventional cameras with removable image forming lens.

Figure 4:
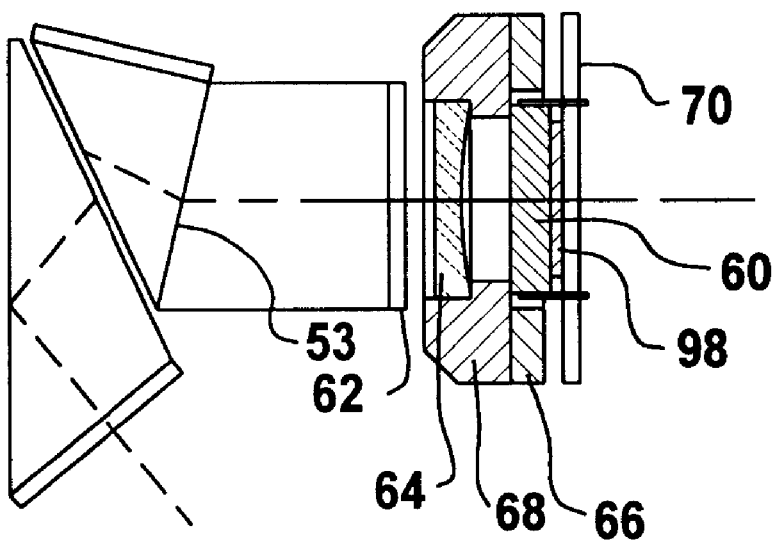
FIG. 4 is a diagrammatic illustration of mounting features for a compensating lens and array.

In FIG. 4 details of the prism assembly and one of the associated image arrays 60 and related structure are illustrated. Trim filter 62 is bonded to prism assembly 53. Bonding the trim filter 62 to the prism eliminates two air-glass interfaces, decreasing reflective losses. Compensating lens 64 is bonded into lens retainer 68 which fixes the position of the compensating lens relative to the imaging array 60. The imaging array is bonded into array holder 66. A thermal conductive medium 98 of any suitable commercially available type between the imaging array and array support electronics printed circuit board 70 dissipates heat generated by the imaging array.

Figure 5:
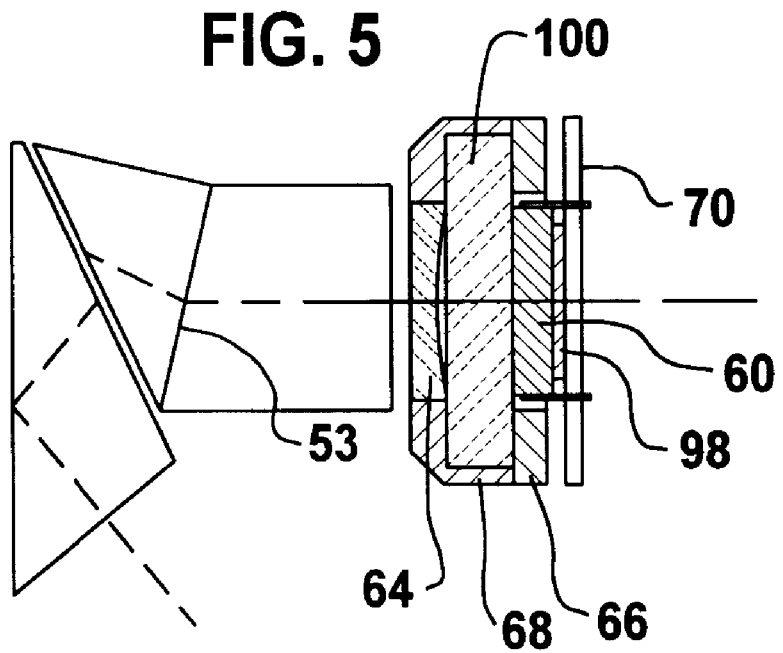
FIG. 5 is a diagrammatic illustration of mounting features for a compensating lens mounted in front of a trim filter.

In FIG. 5 a trim filter 100 is shown as being mounted between the compensating lens 64 and the imaging array 60. This configuration allows commercial mounted narrowband filters to be used for trim filters. The FIG. 4 configuration with the trim filter bonded to the prism is best suited for use with unmounted single layer glass trim filters.

Figure 6:
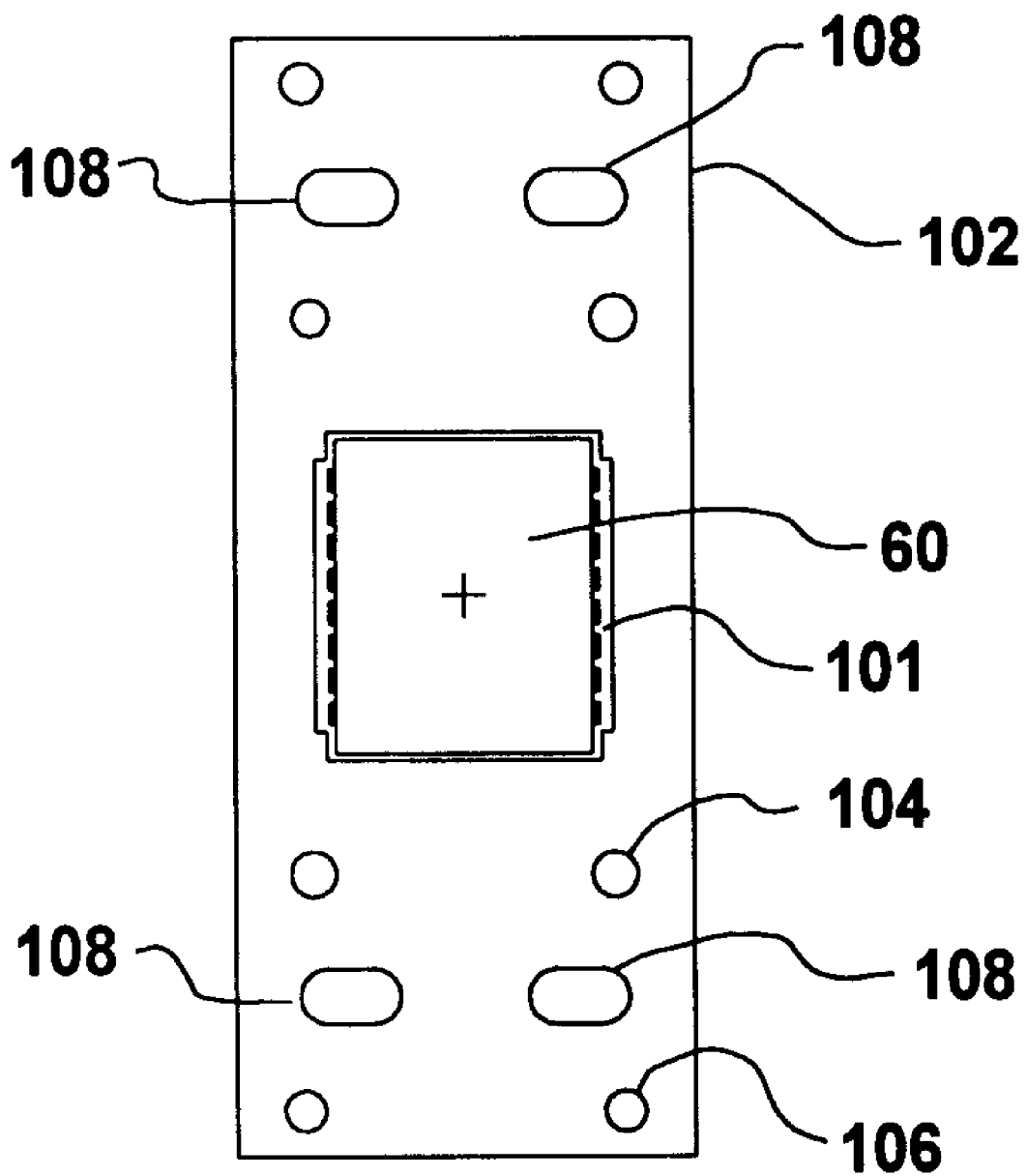
FIG. 6 is a simplified plan view of an imaging array of the invention bonded to an array mount.

In FIG. 6 an imaging array 60 is shown as being bonded using an adhesive 101 into an array holder 102. The imaging array mounts in the array holder such that the glass window (not shown) incorporated on the array is flush with an array holder planar surface and the image sensor of the array is perpendicular to the array holder. A rectangular hole in the array holder 102 provides accurate positioning of the imaging array 60 while having relief regions to preclude electrical contact between the array holder and array electrical terminals. Adhesive potting between the array holder and array provides good mechanical support without relying on the array electrical leads for mechanical support and positioning. Holes 104 and 106 may be used to mount additional hardware. Slots 108 are provided for the purpose which will be described below with reference to FIGS. 9 and 10.

Figure 7:
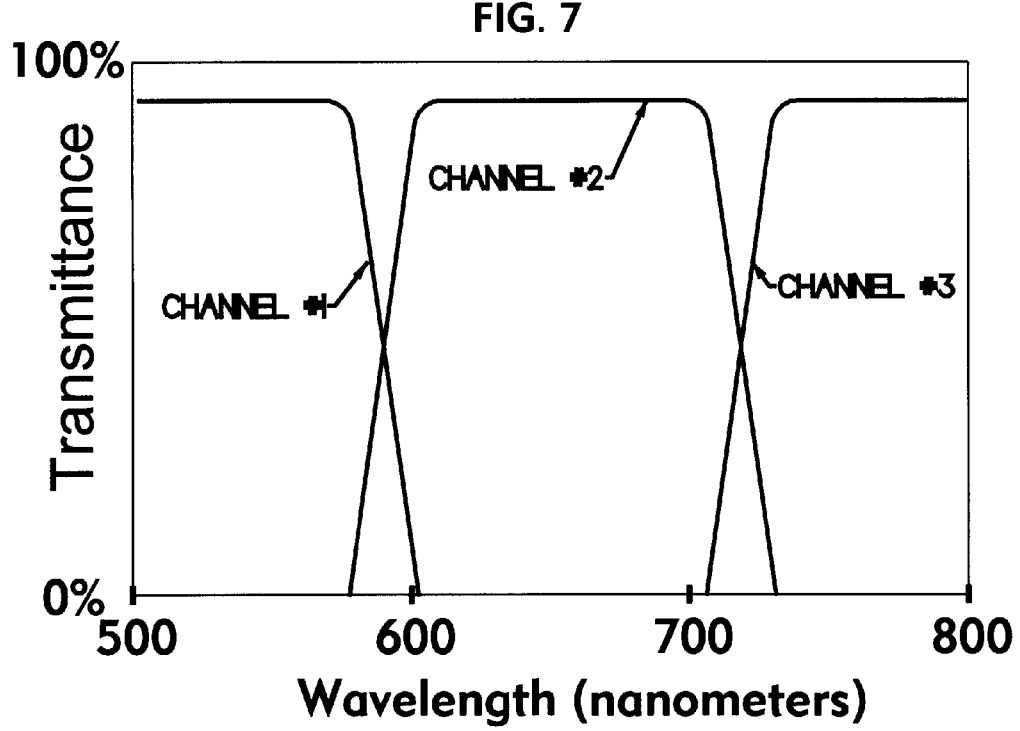
FIG. 7 illustrates the spectral bandpass for a color infrared 3-CCD prism.

In FIG. 7 the dichroic nature of a representative color separating prism is illustrated, showing nominal spectral bands separated by the prism dichroic coated elements. In this example the spectral bands for Channels 1–3 are nominally green, red, and near infrared, respectively. Broad spectral bands are separated by the prism assembly.

Figure 8:
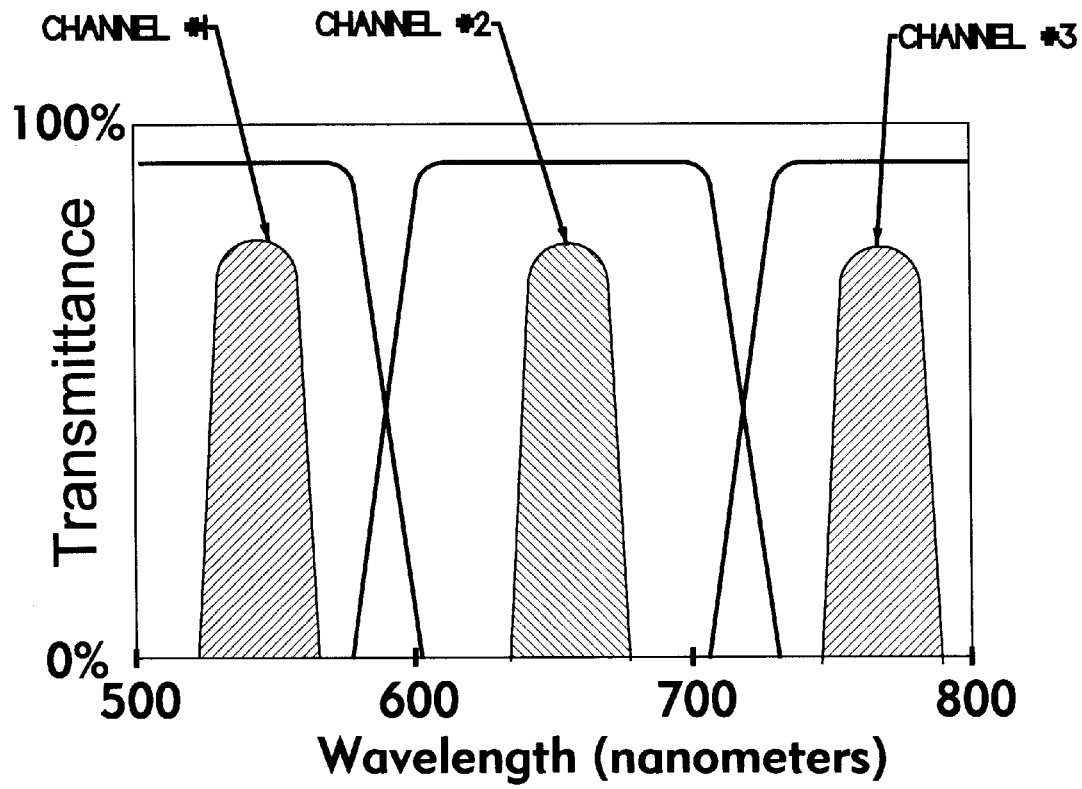
FIG. 8 illustrates the spectral bandpass for a color infrared 3-CCD prism with bandpass trim filters.

In many applications it is desirable to use trim filters to block out-of-band radiation transmitted by the prism dichroic coatings. The trim filters can also be used to decrease the spectral band transmitted to the imaging detectors. The cross-hatched regions in FIG. 8 illustrate the spectral narrowing of the image channels.

In some applications it is desirable to separate one spectral band into two different polarizations. In this case coating 22 in FIG. 1 would be a polarization separating coating. Imaging arrays 32 and 34 receive the S and P polarizations of otherwise spectrally identical images. Trim filters 38 and 40 can be used to independently regulate the spectral bands received by arrays 32, 34 or the trim filters can be identical.

Figure 9:
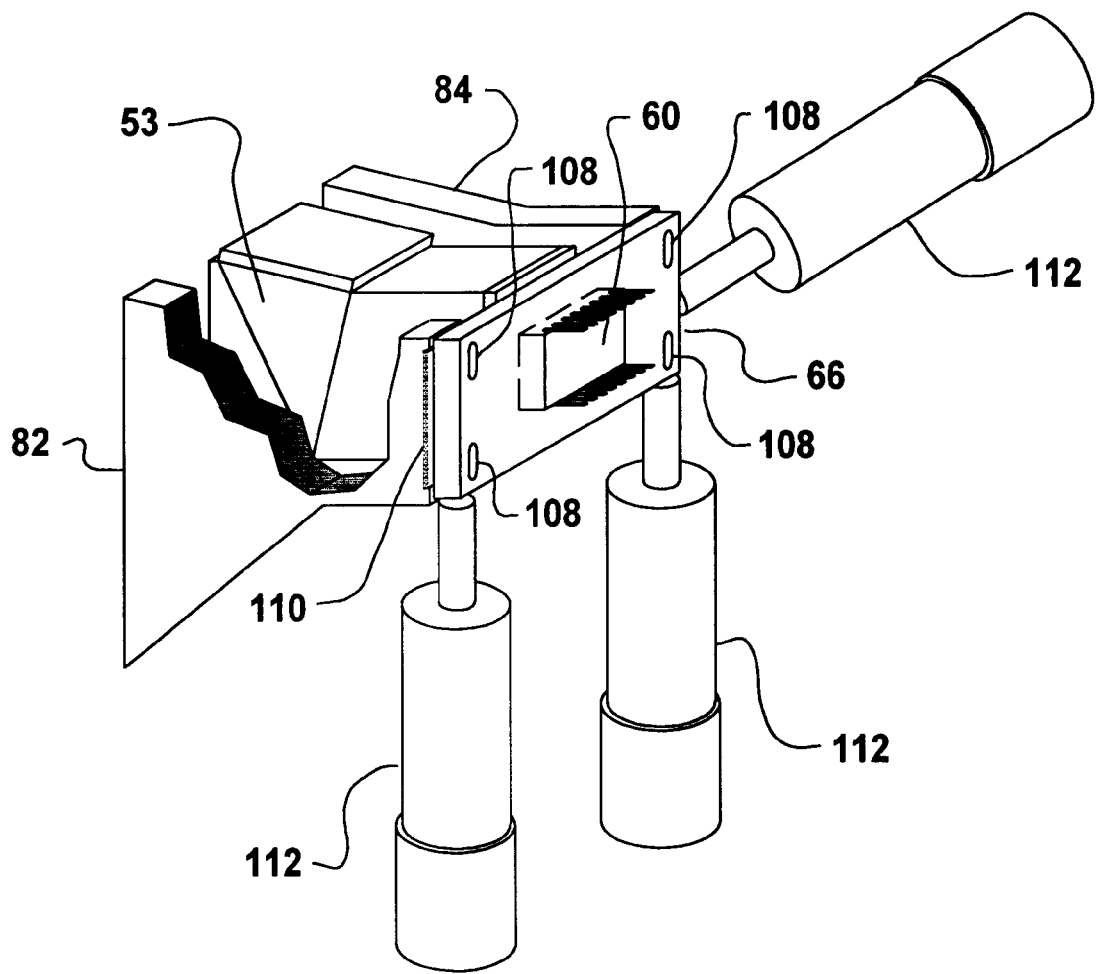
FIG. 9 is a diagrammatic, perspective view of an alignment fixture used to align an imaging array relative to a prism.

In FIG. 9 an approach used to adjust the alignment of an image array 60 relative to the color separating prism 53 is shown. Focus is adjusted using shims such as shim 110 between the mounting rails 82, 84 and the array holder 66. Rotation and horizontal and vertical alignment are adjusted using micrometers 112 or other fine adjustment devices. Slotted holes 108 in the array holder allow motion of the array holder relative to the mounting rail when not tightened down and fixed in place. Screws (not shown) passing through the slotted holes into the mounting rails are used to fix the position of the array relative to the prism once the array is in the desired position.

Figure 10:
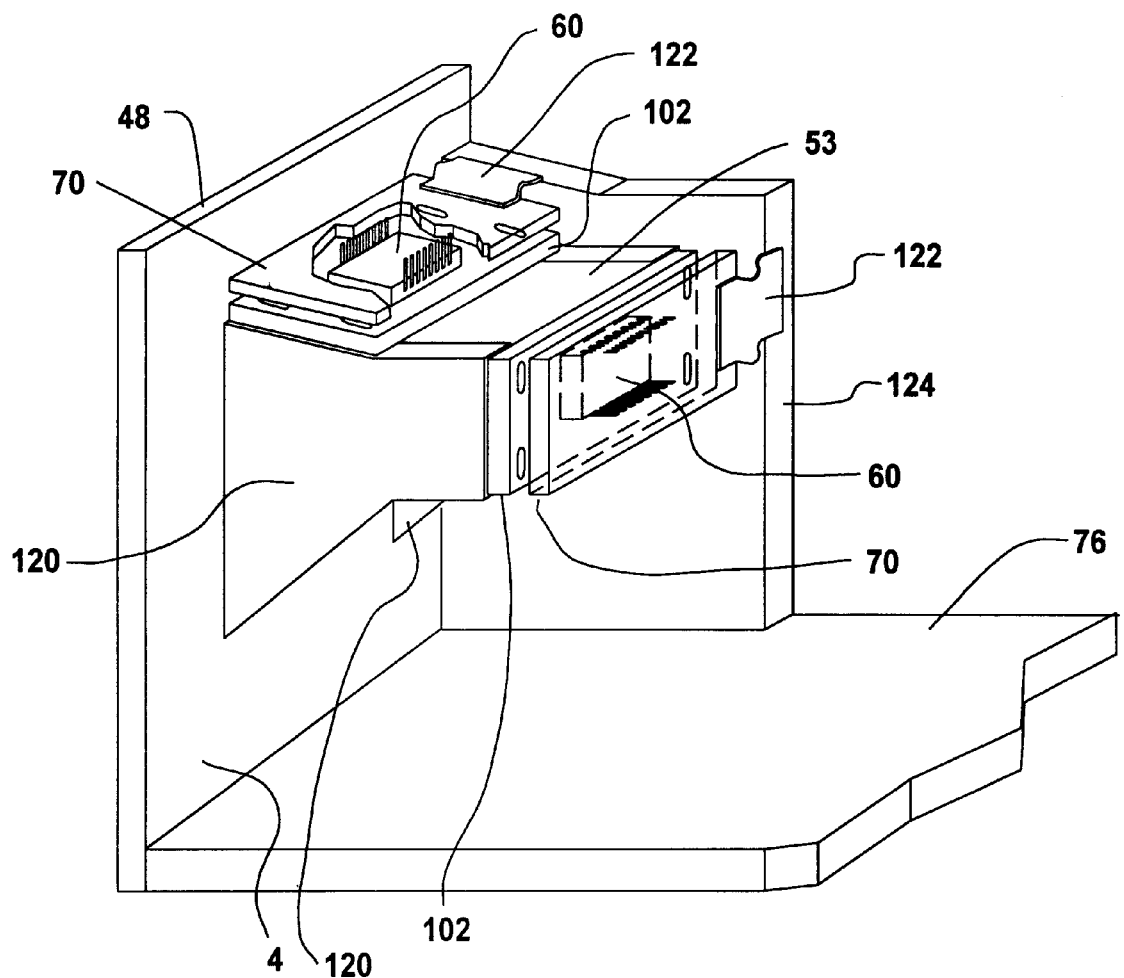
FIG. 10 is a perspective view in partial section illustrating a thermal conductive cooling system for the array and array electronics.

In the arrangement of FIG. 10, the array printed circuit boards 70 are bonded to imaging sensors 60 which are bonded into array holders 102. The prism unit 53 is mounted to the mounting rails 120 which in turn are anchored to the camera front mounting plate 48. Heat dissipated in the imaging array is conducted to the array printed circuit board. Heat from the board is conducted through a high thermal conductivity flexible ribbon 122 to a thermal shunt plate 124. The thermal shunt plate 124 conducts heat into the camera base plate 76. This shunt plate also provides mechanical support between the front plate 48 and base plate 76. Cooling the imaging array by shunting heat reduces the temperature of the imaging array. Temperature induced noise in the array generally doubles for every 10 degrees centigrade temperature rise. Shunting thermal energy decreases temperature gradients in the prism thereby reducing temperature induced refractive behavior in the prism.

Commercial color separating prisms commonly separate an image into primary color components (red, green, and blue). Multispectral cameras have been built that use a color separating prism to separate green, red, and near infrared spectral bands. With each of these configurations three monochrome imaging arrays are used to capture the three spectral band images.

Figure 11:
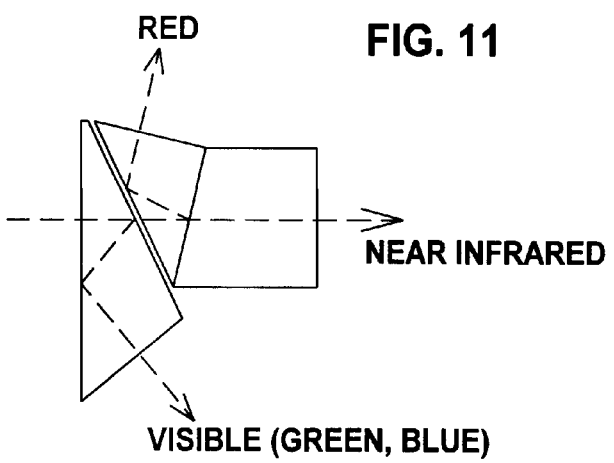
FIG. 11 is an optical diagram of a color separating prism configuration for a four band combined primary color and color infrared system using the green and blue channels from a color mosaic array.

In FIG. 11 a color separating prism is used to separate a blue-green band, a red band, and a near infrared band. A color mosaic array is used in the blue-green channel to image the blue and green images. Color mosaic arrays are used in virtually every single array camcorder and digital still camera. The Bayer pattern mosaic consisting of alternating rows of red-green-red-green pixels and blue-green-blue-green pixels is one of the most common color mosaic patterns. Monochrome arrays are used in the red and near infrared channels. Digital signal processing is used to extract the data from the color mosaic array to provide blue and green images. These four color planes (blue, green, red, and near infrared) are combined to form a normal primary color image (red, green, blue) and color infrared (green, red, near infrared) image combining the functionality of what would otherwise require two cameras into a single camera.

Figure 12:
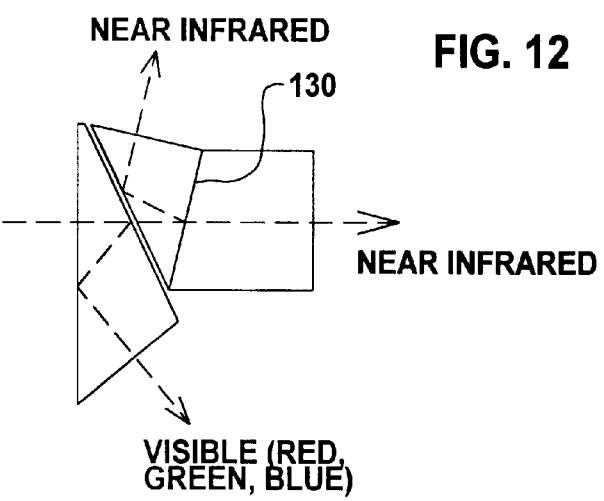
FIG. 12 is an optical diagram of an embodiment showing the positive and negative lenses used for image aberration and size compensation with a SLR objective lens.

In FIG. 12 the color separating prism separates the visible image from the near infrared. A color mosaic imaging array images the primary color components (red, green, blue). A dichroic coating 130 separates the near infrared into two different spectral bands which are imaged by two monochrome arrays.

Figure 13:
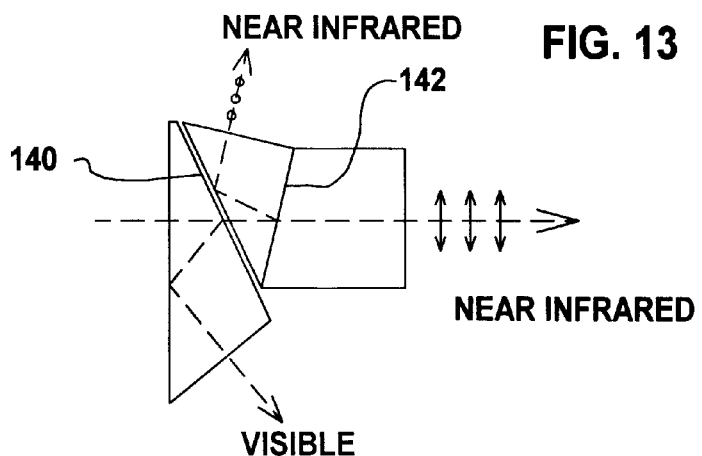
FIG. 13 is an optical diagram for a color separating prism that has a polarization separation coating for two channels.

In FIG. 13 the color separating prism separates the visible color image from near infrared at coated surface 140. The near infrared is separated into two different polarizations at coated surface 142. This prism configuration provides two spectrally identical near infrared channels with one channel imaging the S-polarization and the other imaging the P-polarization components.

Figure 14:
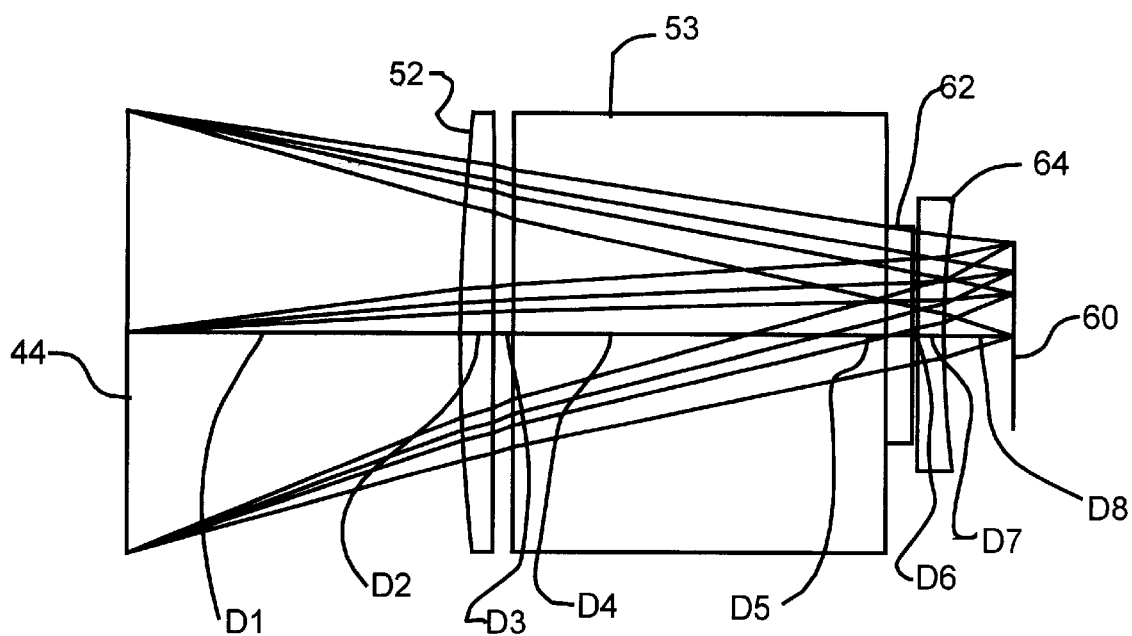
FIG. 14 illustrates an optical diagram for a five band color separating prism that uses a color mosaic array for primary colors and monochrome arrays for near infrared channels.

FIG. 14 is an optical diagram of the color separating prism and compensating optics according to the first embodiment (the embodiment of FIG. 2) of the invention. The SLR lens is represented by a paraxial element with a focal length of 60 mm. This value was selected based on laboratory measurements of commercial SLR lenses. Measurements of image size as a function of wavelength were used to determine the required image size compensation. A plano-convex lens 52 is placed between the SLR lens 44 and color sorting prism 53 with the convex surface toward the SLR lens. A plano-concave lens is placed between color sorting prism 53 and image sensor 60. Trim filters 62 can be mounted next to the prism. The distance between the negative focal length lens 44 and image sensor 60 is used to adjust image size and the distance between the prism 53 and negative focal length lens/image sensor assembly is used to control focus in each imaging channel.

Figure 15:
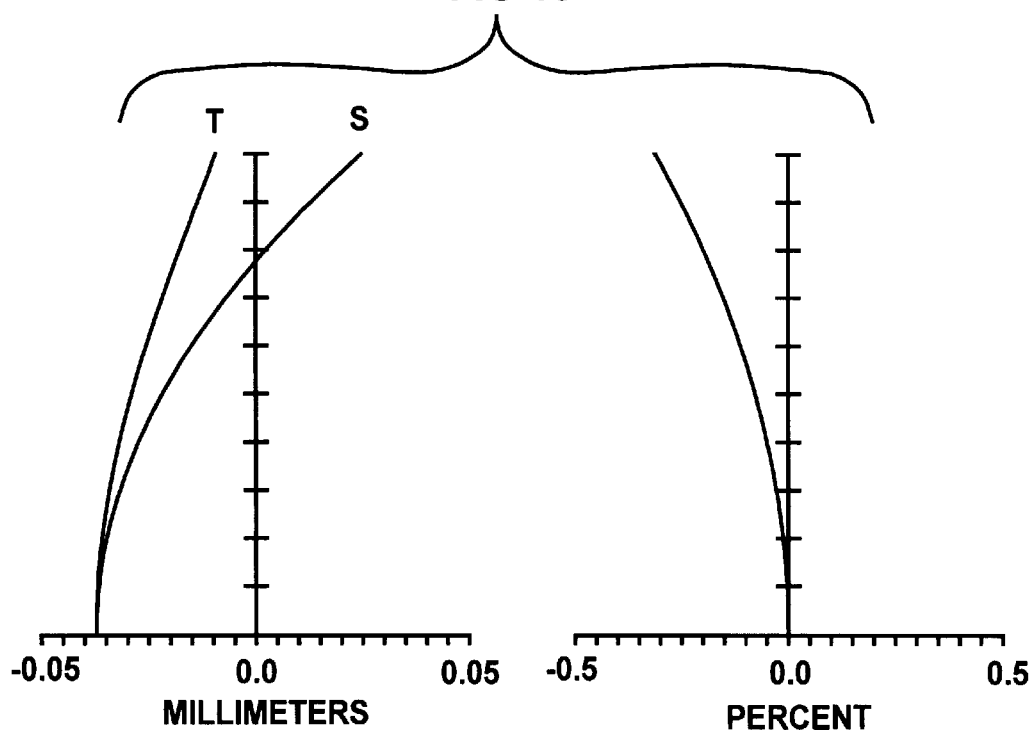
FIG. 15 illustrates the field curvature and image distortion for SLR lens compensation without using an aspheric compensator.

Numerical values for the working example shown in FIG. 14 are provided in TABLE 1. In this table, S represents the surface number. R represents the optical surface radius of curvature in millimeters units. The values tabulated in column D are the distances between surfaces in units of millimeters. The columns V and N show the index of refraction and Abbe number for optical materials used in this working example. FIG. 15 shows the image distortion for this working example. The compensating optics reduce the RMS spot size to approximately 10% of the RMS spot size for an uncompensated f/1.4 optical system based on an SLR lens and a color separating prism.

TABLE 1

| S | R | D | V | N |
|---|---|---|---|---|
| 1 | Infinite | 25.0 | | |
| 2 | 77.52 | 2.5 | 1.517 | 64.17 |
| 3 | Infinite | 1.5 | | |
| 4 | Infinite | 28.17 | 1.603 | 38.03 |
| 5 | Infinite | 2.0 | 1.785 | 25.76 |
| 6 | Infinite | D6 | | |
| 7 | Infinite | 2.0 | 1.785 | 25.76 |
| 8 | 43.776 | D8 | | |

TABLE 2 lists the spacings between the prism and plano-concave compensating lens (D6) and the plano-concave compensating lens and image plane (D8). The image size was selected based on the required image size compensation for a laboratory characterized SLR lens to provide an optical configuration with identical image sizes for the three multispectral images. The design wavelengths for the three multispectral channels were 0.550, 0.630 and 0.850 microns.

TABLE 2

| Wavelength | .550 | .630 | .850 |
|---|---|---|---|
| D6 | .0676 | 0 | .3749 |
| D8 | 5.7636 | 5.7666 | 5.2213 |
| Image Size | 7.134 | 7.134 | 7.086 |

Figure 16:
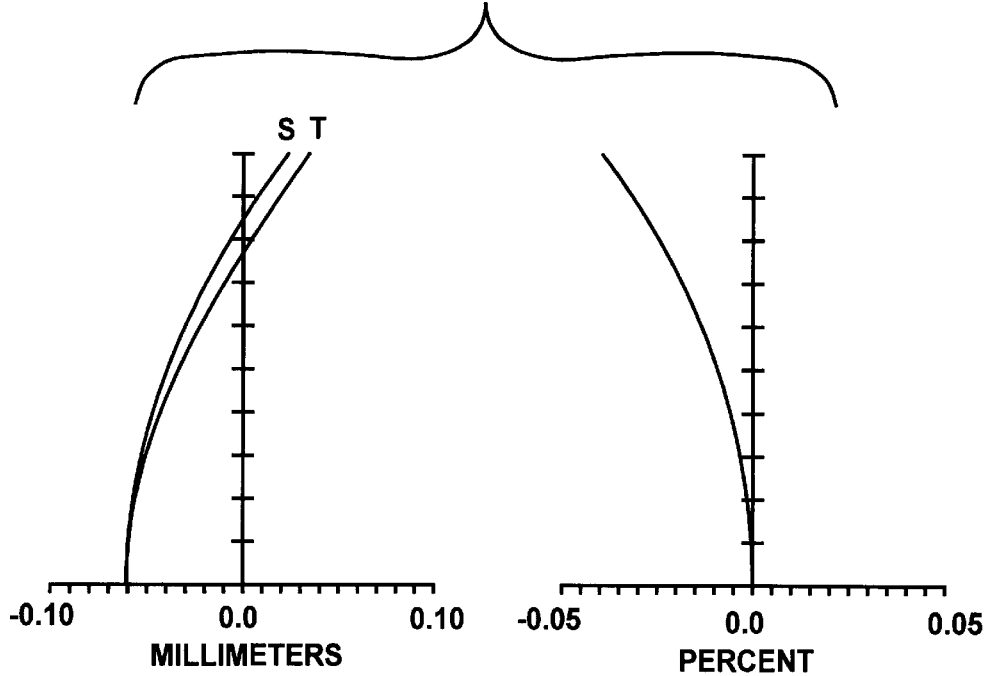
FIG. 16 illustrates the field curvature and image distortion for the SLR lens compensation using an aspheric compensator.

A configuration of FIG. 2 embodiment is described that uses an aspheric surface on the negative focal length lens to compensate for distortion. The working values for this configuration are shown in TABLE 3 and the aspheric parameters are shown in TABLE 4 for the aspheric concave surface 8. TABLE 5 shows the plano-concave compensating lens positioning for the nominal wavelengths specified. FIG. 16 shows the field curvature and distortion of the image for an SLR lens with a color separating prism and compensating optics that include an aspheric surface in the negative power element.

TABLE 3

| S | R | D | V | N |
|---|---|---|---|---|
| 1 | Infinite | 25.0 | | |
| 2 | 77.52 | 2.5 | 1.517 | 64.17 |
| 3 | Infinite | 1.5 | | |
| 4 | Infinite | 28.17 | 1.603 | 38.03 |
| 5 | Infinite | 2.0 | 1.785 | 25.76 |
| 6 | Infinite | D6 | | |
| 7 | Infinite | 2.0 | 1.785 | 25.76 |
| 8* | 44.039 | D8 | | |

TABLE 4

(Aspherical Face Detail)

| S | Coefficient | Value |
|---|---|---|
| 8* | K | −.9846 |
| | $C_2$ | 0.0004 |
| | $C_4$ | $1.3385 \times 10^{-5}$ |

TABLE 5

| Wavelength (um) | .550 | .630 | .850 |
|---|---|---|---|
| D6 | .0683 | 0 | .2713 |
| D8 | 5.7650 | 5.7797 | 5.3651 |
| Image Size | 7.124 | 7.124 | 7.06 |

Figure 17:
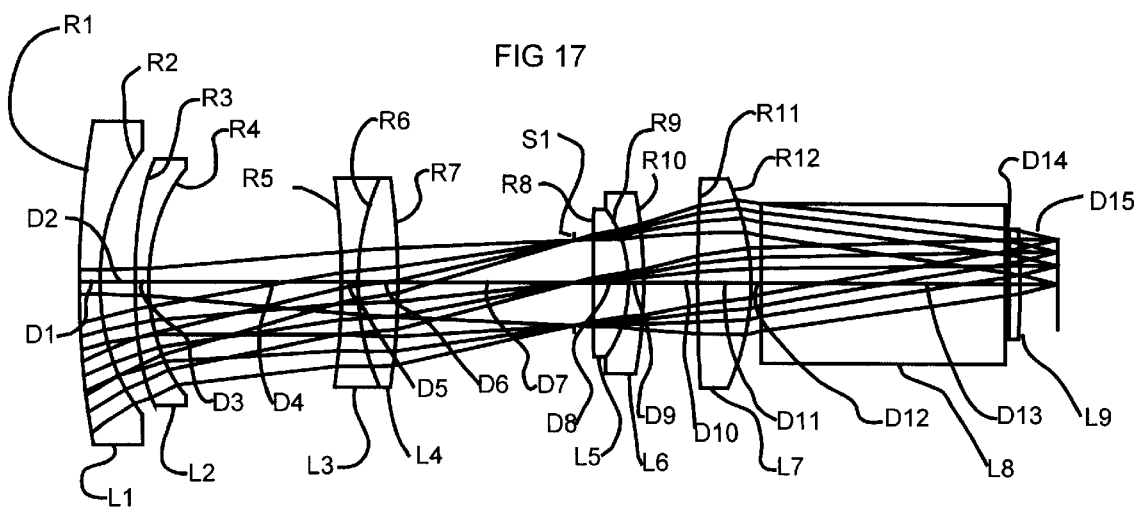
FIG. 17 is an optical diagram of a representative multi-element lens employed in an embodiment of the apparatus.

In addition to compensating for color sorting prism and SLR induced aberrations, the present invention can be used to accurately correct image size and minimize image distortion and aberrations in a multielement lens system built specifically for use in multispectral imaging, providing performance improvement over existing cameras. The working example for a 60 degree field-of-view, low distortion lens shown in FIG. 17 is as follows. The first lens group has negative power. It consists of two negative lenses, the second of which has at least one aspheric surface. The second and third lens groups are color correcting doublets. The fourth lens group consisting of a single element has positive power and at least one surface is aspheric. TABLE 6 shows the numerical values for the working example in FIG. 17. The aspheric parameters are listed in TABLE 7 and the compensating lens positioning dimensions are listed in TABLE 8.

TABLE 6

| S | R | D | N | V |
|---|---|---|---|---|
| 1 | 72.89114 | 3 | 1.5725 | 57.55 |
| 2 | 19.09028 | 5.019351 | | |
| 3* | 170.0669 | 1.99998 | 1.6229 | 58.06 |
| 4 | 16.06152 | 27.8568 | | |
| 5 | −60.58913 | 2.4 | 1.6516 | 58.52 |
| 6 | 20.62192 | 5.8 | 1.7552 | 27.58 |
| 7 | −55.68347 | 25.75514 | | |
| STO | Infinity | 2.736807 | | |
| 9 | 187.0437 | 5.2 | 1.523 | 51.49 |
| 10 | −10.67661 | 2.2 | 1.805 | 25.43 |
| 11 | −38.63693 | 7.863017 | | |
| 12 | 139.4467 | 7.805505 | 1.6229 | 58.08 |
| 13* | −16.9678 | 1.5 | | |
| 14 | Infinity | 35.335 | 1.6034 | 38.03 |
| 15 | Infinity | D15 | | |
| 16 | Infinity | 1.5 | 1.7847 | 25.78 |

TABLE 6-continued

| S | R | D | N | V |
|---|---|---|---|---|
| 17 | −78.69214 | 5.235 | | |
| 18 | Infinity | D18 | | |
| IMA | Infinity | | | |

TABLE 7

(Aspherical Face Detail)

| S | Coefficient | Value |
|---|---|---|
| 3* | K | 154.566 |
| | $C_2$ | 0.0081 |
| | $C_4$ | $3.0566 \times 10^{-5}$ |
| | $C_6$ | $-2.2647 \times 10^{-8}$ |
| 13* | K | −0.8011 |
| | $C_2$ | 0.0005 |
| | $C_4$ | $1.4155 \times 10^{-5}$ |
| | $C_6$ | $-1.0778 \times 10^{-8}$ |

TABLE 8

| Wavelength (um) | .550 | .630 | .850 |
|---|---|---|---|
| D15 | .7904 | .5983 | .0000 |
| D18 | .0045 | .1918 | .7960 |
| Image Size | 7.124 | 7.124 | 7.06 |

What is claimed is:

1. Apparatus for forming multiple subimages, said apparatus comprising, in combination:

an image forming lens for forming a primary image;

a prism for receiving a primary image formed by said image forming lens and separating the primary image into a plurality of subimages comprised of visible or non-visible light, said subimages having different characteristics;

subimage receptor means in operative association with said prism for receiving said subimages, said subimages passing through separate optical channels; and first light refractive means between said image forming lens and said subimage receptor means introducing optical aberrations at least partially negating optical aberrations caused by said prism.

2. The apparatus according to claim 1 wherein said prism is a color separating prism separating said primary image into a plurality of subimages having different spectral characteristics and passing through said separate optical channels.

3. The apparatus according to claim 1 wherein said prism is a polarizing prism separating said primary image into a plurality of subimages of different polarization.

4. The apparatus according to claim 1 wherein said subimage receptor means comprises a plurality of subimage receptors, each subimage receptor receiving a different subimage, said apparatus additionally comprising second light refractive means located in each of said separate optical channels between said prism and a subimage receptor for modifying the sizes of said subimages.

5. The apparatus according to claim 1 wherein said first light refractive means comprises at least one positive focal length lens having at least one aspheric surface for at least partially compensating for spherical aberrations caused by said prism.

6. The apparatus according to claim 4 wherein said second light refractive means comprises at least one negative focal length lens having at least one aspheric surface for at least partially compensating for spherical aberrations caused by said prism.

7. The apparatus according to claim 1 wherein said subimage receptor means comprises a plurality of electronic image sensors.

8. The apparatus according to claim 7 wherein at least one of said electronic image sensors comprises a CCD image sensing array.

9. The apparatus according to claim 7 wherein each of said electronic image sensors comprises a CCD image sensing array.

10. The apparatus according to claim 1 wherein said first light refractive means comprises a multi-element lens in front of the prism and wherein said apparatus additionally comprises at least one image size adjusting lens between the prism and the subimage receptor means in each optical channel.

11. The apparatus according to claim 2 wherein said color separating prism is coated with dielectric interface coatings separating the primary image into two or more spectral bands in a spectral range from the ultraviolet to near infrared.

12. The apparatus according to claim 1 additionally comprising a plurality of trim filters operatively associated with said prism to block light and restrict the subimages to one or more predetermined spectral ranges.

13. The apparatus according to claim 1 additionally comprising at least one trim filter bonded to said prism to restrict at least one subimage to one or more predetermined spectral ranges.

14. The apparatus according to claim 1 additionally comprising at least one trim filter for restricting a subimage to one or more predetermined spectral ranges located in front of said subimage receptor means.

15. The apparatus according to claim 1 additionally comprising a compensating lens disposed between said prism and the subimage receptor means for adjusting the size of a subimage prior to reception thereof by said image receptor means.

16. The apparatus according to claim 1 additionally comprising at least one trim filter releasably connected to said prism.

17. The apparatus according to claim 1 additionally comprising a camera housing, a printed circuit board holder affixed to said camera housing, a thermal conducting mount, and a printed circuit board positioned in said printed circuit board holder, said thermal conducting mount releasably retaining said printed circuit board in said printed circuit holder and maintaining thermal contact between the printed circuit board and the printed circuit board holder to promote thermal conduction cooling of said printed circuit board and lessen thermal convection load into other components of said apparatus within said camera housing.

18. The apparatus according to claim 17 wherein said camera housing includes sealed top, bottom, side and rear panels and a camera front including a front mounting plate and a lens retainer attached to said front mounting plate, a compensating lens being attached to said lens retainer, said camera front having mounting means mounting said image forming lens on said housing in front of said compensating lens, said top, bottom, side and rear panels, said front mounting plate, said lens retainer and said compensating lens forming a hermetically sealed enclosure.

19. The apparatus according to claim 4 wherein said second light refractive means includes at least one compensating lens and wherein said apparatus additionally includes a compensating lens retainer retaining said compensating lens in position relative to a subimage receptor including an imaging array and an array support electronics printed circuit board, and an array holder holding said imaging array, said array holder being attached to said lens retainer, and a thermal conductive medium between the imaging array and the array support electronics printed circuit board to dissipate heat generated by the imaging array.

20. The apparatus according to claim 19 additionally comprising a trim filter disposed between the compensating lens and the imaging array.

21. The apparatus according to claim 19 wherein said imaging array is bonded by adhesive to said array holder, a portion of said imaging array projecting through an opening formed in said array holder.

22. The apparatus according to claim 1 wherein said subimage receptor means includes an imaging array and an array support electronics printed circuit board, said apparatus additionally including adjustment means for adjusting the position of said imaging array relative to said prism.

23. The apparatus according to claim 22 wherein said apparatus includes spaced mounting rails and wherein said adjustment means includes an array holder attached to said imaging array and selectively movably mounted on said rails.

24. The apparatus according to claim 23 wherein said adjustment means includes at least one shim disposed between said array holder and at least one of said rails.

25. The apparatus according to claim 1 wherein said subimage receptor means includes an imaging array and an array support electronics printed circuit board, said apparatus additionally including heat dissipating means for receiving and dissipating heat from said imaging array and said array support electronics printed circuit board.

26. The apparatus according to claim 25 wherein said heat dissipating means includes a heat receiving member and at least one heat transmission member disposed between and interconnecting said heat receiving member and said array support electronics printed circuit board.

27. The apparatus according to claim 1 wherein said first light refractive means is positioned between said image forming lens and said prism.

28. The apparatus according to claim 1 wherein said first light refractive means is positioned between said prism and said subimage receptor means.

29. Apparatus for forming multiple subimages, said apparatus comprising, in combination:

an image forming lens for forming a primary image;

a prism for receiving a primary image formed by said image forming lens and separating the primary image into a plurality of subimages comprised of either visible or non-visible light;

a positive focal length lens located between said image forming lens and said prism for introducing aberrations at least partially compensating for spherical aberrations caused by said prism;

subimage receptor means in operative association with said prism for receiving said subimages, said subimages passing through separate optical channels; and a negative focal length lens located between said prism and said subimage receptor means for controlling size of said subimages.

30. Apparatus for forming multiple subimages, said apparatus comprising, in combination:

an image forming lens for forming a primary image;

a prism for receiving a primary image formed by said image forming lens and separating the primary image into a plurality of subimages comprised of visible or non-visible light, said subimages having different characteristics;

subimage receptor means comprising a plurality of electronic image sensors in operative association with said prism for receiving said subimages, said subimages passing through separate optical channels; and heat receptor means for receiving heat from said electronic image sensors to direct heat generated by said electronic image sensors away from said prism.

31. The apparatus according to claim 30 additionally comprising holders for holding said electronic image sensors.

32. The apparatus according to claim 31 additionally comprising adjustment means for adjusting the positioning of said holders and electronic image sensors held thereby relative to said prism.

33. Apparatus for forming multiple subimages, said apparatus comprising, in combination:

an image forming lens for forming a primary image;

a color separating prism for receiving a primary image formed by said image forming lens and separating the primary image into a plurality of subimages; and subimage receptor means in operative association with said color separating prism for receiving said subimages, said subimages passing through separate optical channels, said subimage receptor means comprising a plurality of CCD sensors including a color mosaic array and two monochrome arrays cooperable with said prism for providing five band imaging, three of said five bands being red, green and blue employing the color mosaic array and two of the five bands being near infrared bands using the two monochrome arrays.

34. Apparatus for forming multiple subimages, said apparatus comprising, in combination:

an image forming lens for forming a primary image;

a color prism for receiving a primary image formed by said image forming lens and separating the primary image into a plurality of subimages; and subimage receptor means in operative association with said color separating prism for receiving said subimages, said subimages passing through separate optical channels, said subimage receptor means comprising a plurality of CCD sensors including a color mosaic array and two monochrome arrays cooperable with said prism for providing four band imaging, two of said four bands being green and blue employing the color mosaic array, one of said four bands being red utilizing one of said monochrome arrays and one of said four bands being near infrared utilizing the other of said monochrome arrays.

35. Apparatus for forming multiple subimages, said apparatus comprising, in combination:

an image forming lens for forming a primary image;

a prism for receiving a primary image formed by said image forming lens and separating the primary image into a plurality of subimages comprised of visible or non-visible light, said subimages having different characteristics;

subimage receptor means comprising a plurality of electronic image sensors in operative association with said prism for receiving said subimages, said subimages passing through separate optical channels;

holders for holding said electronic image sensors; and adjustment means for adjusting the positioning of said holders and electronic image sensors held thereby relative to said prism.

\* \* \* \* \*